… … …

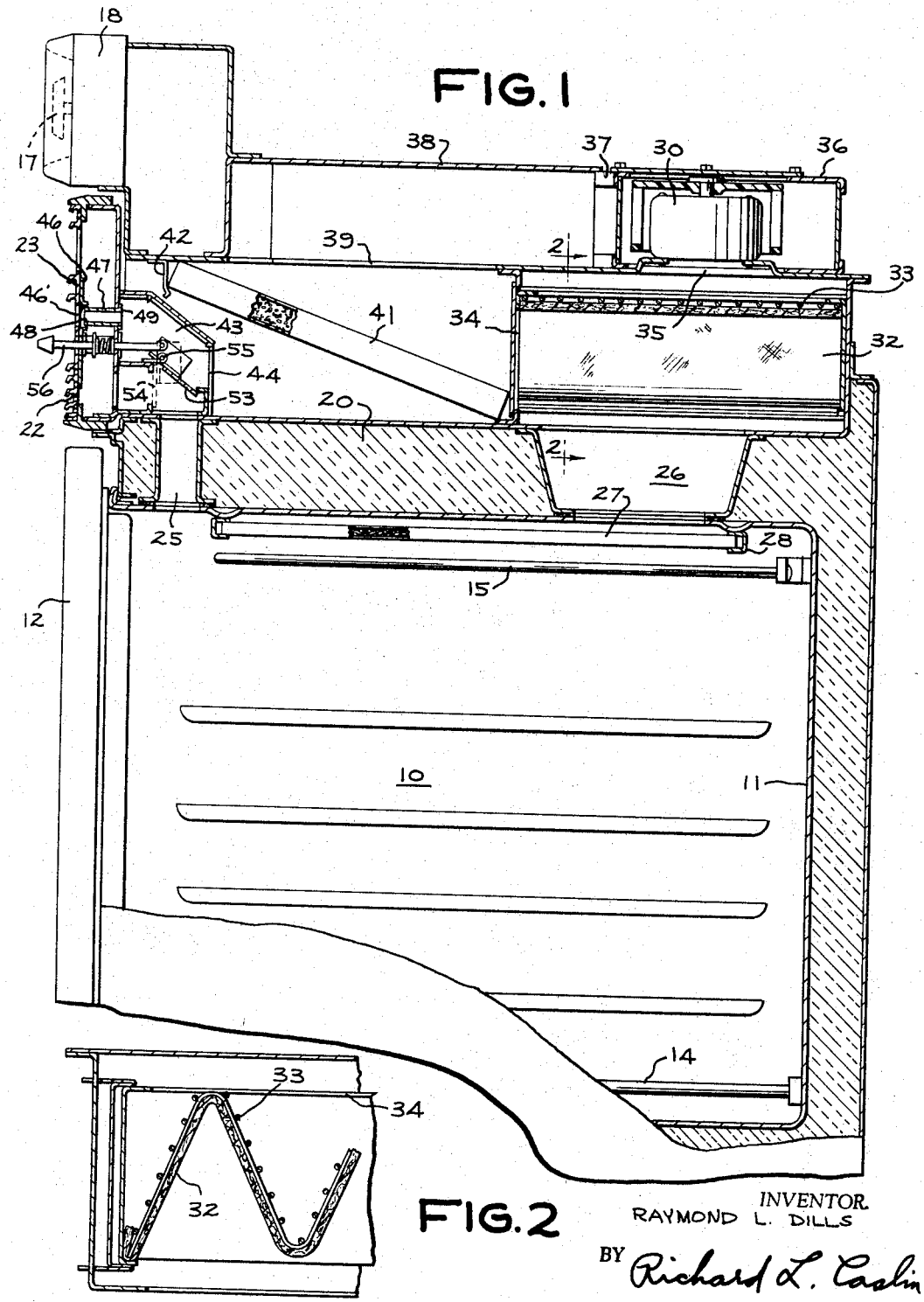

United States Patent Office 3,328,560
Patented June 27, 1967

3,328,560
RECIRCULATING VENTING SYSTEM FOR
DOMESTIC OVEN
Raymond L. Dills, Louisville, Ky., assignor to General
Electric Company, a corporation of New York
Filed Dec. 2, 1964, Ser. No. 415,537
11 Claims. (Cl. 219—391)

The present invention relates to domestic cooking ovens and particularly to a recirculating venting system for the oven that does not require an exhaust duct to the outside of the kitchen, but instead filters the oven air of grease, smoke and odors and then returns the filtered air to the kitchen atmosphere.

Domestic ovens are frequently designed for performing both baking and broiling operations. During a broiling operation the oven heating means is usually set at a maximum energy output and the oven door is set ajar so that a large volume of room air will pass through the oven cavity and hold down the oven air temperature while allowing the food to be cooked, mainly by radiant energy from the heating means. During normal cooking operations and especially during broiling, grease, smoke and odors are generated within the oven cavity and it is preferable to either discharge the oven air outside the kitchen or to filter these undesirable constituents out of the oven air before such air is returned to the kitchen atmosphere. The present invention is concerned with a recirculating or ductless ventilating system for a domestic oven which is capable of filtering the oven air before such air is returned to the kitchen atmosphere.

The principal object of the present invention is to provide a recirculating venting system for a domestic oven with cool air mixing means being provided at the oven air outlet to insure that the temperature of the oven exhaust as it reaches the kitchen is not above a critical amount.

A further object of the present invention is to provide a recirculating venting system for a domestic oven including grease filtering means within the oven cavity, a blower means outside the oven cavity for drawing oven air from the cavity, and both a smoke filter and an odor filter for treating the oven air before it is returned to the kitchen atmosphere.

A further object of the present invention is to provide a combined grease filter and broiler reflector for use with a venting system of an electric oven.

A further object of the present invention is to provide a built-in domestic oven with a recirculating venting system having a damper means for closing the room air inlet when the blower means of the ventilating system is not energized so that the oven may be vented by natural draft through the oven air outlet without having to pass through the blower unit.

A still further object of the present invention is to provide a domestic oven with a recirculating venting system that has means for holding the temperature of the oven exhaust air below about 150° F. at the location where the exhaust air re-enters the kitchen.

The present invention, in accordance with one form thereof, is embodied in a domestic oven that is designed for cooking foods placed therein. The invention is particularly adapted for an electric oven, but it could easily be utilized with a gas oven as well without departing from the scope of the present invention. The oven includes control means for the heating means and a control panel in which at least some of the control means are located. This control panel is provided with both a room air inlet and an oven air outlet. Moreover, the oven cavity includes an oven inlet and an oven vent where the oven inlet communicates with the room air inlet in the control panel, and the oven vent communicates with the oven air outlet. A blower means is located outside the oven cavity for drawing oven air through the oven vent and expelling it through the oven air outlet. The oven air outlet is provided with means for mixing the oven air with relatively cool room air so as to reduce the temperature of the oven exhaust below a critical amount before the exhaust reaches the kitchen. A preferred embodiment of this mixing means is represented by a plurality of nozzles there being an orifice plate over the front of the nozzles where each nozzle directs a jet stream of oven exhaust through one of the orifices. Various types of filtering means may be employed with this invention, as for example, a grease filter located within the oven cavity over the oven vent, a smoke filter positioned between the blower means and the oven vent, and finally an odor and vapor filter located between the blower means and the oven air outlet. In the electric oven version of this invention, the grease filter could be formed of metal mesh construction which overlies a large portion of the top broil unit and serves as a combined heat reflector and grease filter. Moreover, a damper means may be installed in the room air inlet to permit the oven air to bypass the blower unit when the blower unit is not energized.

My invention will be better understood from the following description taken in conjunction with the accompanying drawings and its scope will be pointed out in the appended claims.

FIGURE 1 is a right side elevational view of a built-in wall oven embodying a recirculating ventilating system of the present invention with parts broken away and some in cross-section to show the ventilating system in cooperation with the top wall of the oven.

FIGURE 2 is a fragmentary cross-sectional view taken on the line 2—2 of FIGURE 1 to show a particulate filter for filtering smoke that is located between the blower unit and the oven vent.

Figure 3:
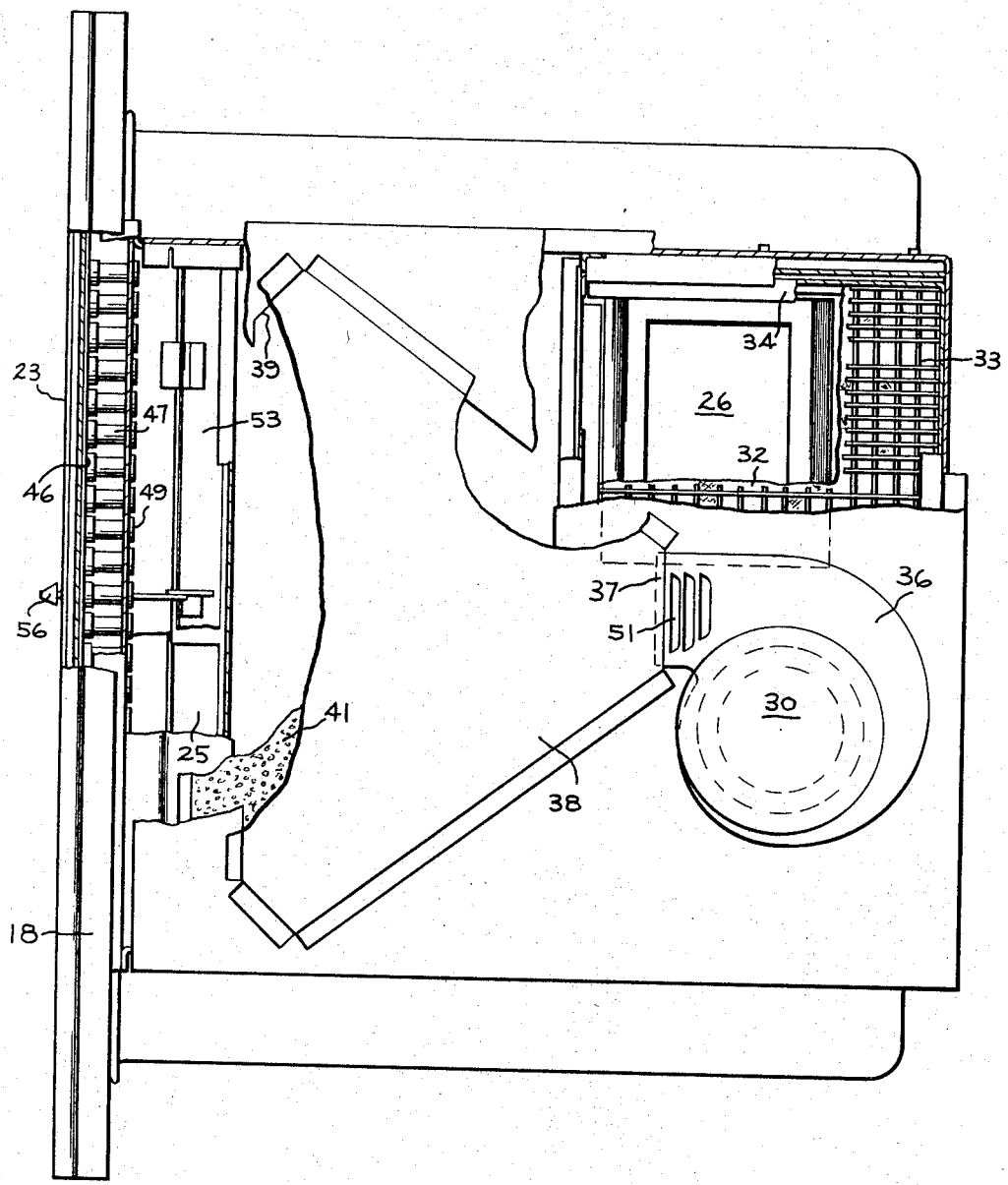
FIGURE 3 is a top plan view of the oven of FIGURE 1 with some parts broken away to show the nature of the particulate filter, the oven vent, the charcoal filter for filtering odors, as well as the plurality of mixing nozzles located behind the control panel at the oven air outlet.

Turning now to a consideration of the drawings and in particular to FIGURE 1 there is shown a built-in wall oven having an oven cavity 10 formed by a box-like oven liner 11 having a front opening that is adapted to be closed by an access door 12. Thermal insulation 20 such as fiberglass surrounds the oven liner to retain the heat generated within the oven cavity. This particular oven is an electric oven having a lower bake heating element 14 and a top broiling element 15 as is standard practice in this art. Control components are needed for governing the energization of these oven heating elements 14 and 15, such as selector switches, thermostats and oven timers and the like. Such control elements are all identified generally as element 17 located in a control panel 18 that is positioned at the top portion of the oven in a plane generally overlying the oven door 12.

The oven structure which has been described above is of a general nature to describe some of the environment in which the present ventilating system invention is utilized. This system is built into the top portion of the oven and is mainly located above the insulated top wall of the oven liner 11 and behind the control panel 18. The control panel may be considered as being divided into three sections; a top portion holding the controls 17, a lower portion serving as a room air inlet 22, and a midportion representing an oven air outlet 23. Thus, the controls 17 are located as remote from the hot oven as is possible. In a complementary manner the top wall of the oven liner 11 includes an oven inlet 25 and an oven vent 26. The oven inlet 25 is toward the front of the oven and communicates with the room air inlet 22, while the oven vent 26 is toward the oven back and communicates with the oven air outlet 23.

A grease filter 27 of reflective metallic mesh construction is located within the oven cavity over the mouth of the oven vent 26. In the electric oven version of this invention, the grease filter 27 is of an enlarged size to overlie a main portion of the top broiler unit 15 so as to serve as a combined heat reflector and grease filter. A suitable releasable fastening means 28 would be supplied for the grease filter 27 to facilitate the ease of removing the filter for cleaning purposes.

A motor-blower unit 30 is located above the oven to draw the air in the oven cavity through the oven vent 26 and expel it through the oven air outlet 23. Interposed between the motor-blower unit 30 and the oven vent 26 is a particulate filter 32 of a sheet or batt of fiberglass or the like material that is of enlarged surface area by being formed into an accordion shape by an open wire supporting framework 33 as is best seen in FIGURE 2. This particulate filter 32 is positioned in a suitable duct work 34 so as to direct the oven air from the oven vent 26 to the intake 35 of the motor blower unit 30.

Now looking at the top plan view of FIGURE 3, the motor-blower unit 30 is supplied with a scroll-shaped housing 36 that has an outlet 37 which discharges into a diverging section of duct 38 having an open bottom portion 39 as is best seen in FIGURE 1. Located beneath the discharge opening 39 is an odor and vapor filter 41 principally of charcoal material that is assembled in a package and positioned at an incline and held in place such as by spring clip member 42. An alternate filtering media would be treated alumina and the like. Duct work 43 of reduced cross-section is located behind the oven air outlet 23 and it has a rear opening 44 through which the oven air must pass after leaving the charcoal filter 41 in order to reach the oven air outlet 23. An important phase of the present invention is centered around the oven air outlet 23. Looking at both FIGURES 1 and 3, the oven air outlet is formed with a front orifice plate 46 that cooperates with a plurality of nozzles 47 located therebehind. Each orifice 46' is of a size slightly larger than the nozzle 47 so that there is a circular air gap between the front tip 48 of the nozzle and the related orifice 46'. The rear entrance 49 of the nozzle opens into the duct 43 so that the oven air is propelled by the blower means 30 into the duct 43 and through the plurality of nozzles 47 which creates a jet air stream through each orifice 46' in the orifice plate 46. The jet stream from each nozzle tends to create a vacuum or negative pressure behind portions of the control panel and thereby draws relatively cool room air behind the control panel and into the jet stream. Thus, the nozzles serve as an air mixing means so as to lower the temperature of the oven exhaust air to beneath a critical temperature of about 135° F. Another point for drawing relatively cool room air into the oven exhaust air is represented in FIGURE 3 by the forwardly facing recessed louvers 51 in the outlet end 37 of the scroll housing 36 of the motor-blower unit 30.

It is also deemed well to provide a means for creating a natural draft exhaust means for the oven in the event the motor-blower unit 30 is not energized. Such a situation would arise when normal baking operations are undertaken in the oven, where the forced air from the blower is not needed. One expedient would be a damper 53 cooperating with the room air inlet 22 to be in one of two possible positions, namely, the full line position shown in FIGURE 1 and a second position shown in dotted line at 54 which closes the room air inlet 22 and connects the oven inlet 25 with the duct 43 and eventually with the oven air outlet 23. Thus, when the damper 53 is in its vertical dotted line position, the oven cavity 10 is vented by natural draft in a reverse direction through the oven inlet 25 and duct 43 through the oven air outlet 23. There is provided a suitable amount of air leakage through the gap left between the oven door 12 and the front of the oven liner 11 so that there will be a gentle sweep of room air through the oven cavity 10 as is conventional in this art. The damper 53 is pivotally mounted as at 55 to one wall of the duct 43 and it is supplied with an actuating lever 56 which extends out through an opening in the control panel 18 for manual operation of the damper.

Modifications of this invention will occur to those skilled in this art therefore it is to be understood that this invention is not limited to the particular embodiments disclosed but that it is intended to cover all modifications which are within the true spirit and scope of this invention as claimed.

What I claim as new and desire to secure by Letters Patent of the United States is:

1. A domestic oven comprising walls defining a bake and broil compartment, and a front-opening access door for the compartment, heating means for said compartment for establishing bake and broil cooking operations, control means for said heating means selectably operable to control the heating means to effect either a bake operation or a broil operation; the invention comprising a recirculating oven venting system built into the top portion of the oven and including a front panel overlying the access door with a room air inlet at the bottom, and an oven air outlet at the midportion of the panel, and a control board at the top of the panel, the top portion of the compartment including an oven inlet at the front thereof communicating with the said room air inlet and an oven vent at the rear thereof, a grease filter located in the compartment over the oven vent, a particulate filter located outside the compartment over the oven vent, a motor-blower unit arranged to draw oven air through the particulate filter, and an odor filter downstream of the motor-blower unit and located adjacent the oven air outlet, said oven air outlet comprising a plurality of nozzles each having a discharge tip, a perforated panel overlying the oven air outlet where the perforations are aligned with the said discharge tips of the nozzle and spaced slightly therefrom for mixing relatively cool room air with the oven exhaust air.

2. A domestic oven comprising walls forming an oven cavity where one wall of the cavity includes a door for gaining access thereto, heating means for said cavity including a lower baking means and an upper broiling means, control means for said heating means selectably operable to effect either a baking or a broiling operation, a recirculating oven venting system built into the oven and including a front panel overlying the door, said panel having control components as well as a room air inlet and an oven air outlet, the oven cavity including an oven inlet communicating with the said room air inlet and an oven vent, a grease filter located over the oven vent, a motor-blower unit for drawing air from the oven cavity through the oven vent, a particulate filter interposed between the blower unit and the oven vent, and an odor filtering media interposed between the blower unit and the oven air outlet, said oven air outlet including a plurality of mixing nozzles for adding relatively cool room air to the oven air as it is discharged through the said front panel.

3. A domestic oven as recited in claim 2 with the addition of an adjustable damper capable of closing the room air inlet and connecting the oven inlet with the oven air outlet, and means allowing a predetermined amount of air leakage into the oven cavity in the vicinity of the access door, whereby when the motor-blower unit is not operating the oven air is discharged by convection air currents sweeping in a reverse direction through the oven inlet and out through the oven air outlet.

4. A domestic oven as recited in claim 2 wherein the said grease filter is of heat reflective metallic mesh construction which covers the major portion of the top wall of the oven cavity and serves as a combined heat reflector of the upper broiling unit as well as a grease filter in cooperation with the oven vent.

5. An electric oven comprising walls forming an oven cavity where one wall of the cavity includes a door for gaining access thereto, an upper broil heating element and a lower bake heating element adapted to be connected to a source of electrical energy, control means for governing the various operations of the oven, a top control panel positioned over the front of the oven, said panel having a lower room air inlet at its bottom portion, an intermediate oven air outlet and a top portion for at least some of the said control means, the oven cavity including an oven inlet and an oven vent, said oven inlet being in the top wall of the cavity adjacent the front thereof to communicate with the said room air inlet, the oven vent also being in the top wall and communicating with the said oven air outlet; blower means interposed between the oven vent and oven air outlet for drawing air through the oven vent, and a perforated heat reflector and grease filter located within the oven cavity above the said upper broil heating element and over the intake to the oven vent.

6. An electric oven as recited in claim 5 with the addition of a particulate filter interposed between the blower means and the oven vent, as well as an odor filtering media interposed between the blower means and the oven air outlet, and cooling means present at the said oven air outlet to dilute the hot gases and thereby lower the exhaust temperature to between about 120° F. and 150° F.

7. An electric oven comprising walls forming an oven cavity where one wall of the cavity includes a door for gaining access thereto, an upper broil heating element and a lower bake heating element adapted to be connected to a source of electrical energy, control means for governing the various operations of the oven, a control panel including a room air inlet, an oven air outlet and supporting at least some of the said control means, the walls of the oven cavity including an oven inlet and an oven vent, the oven inlet communicating with the said room air inlet and the oven vent communicating with the said oven air outlet, and blower means interposed between the oven vent and the oven air outlet for drawing air out of the oven cavity and expelling it from the oven air outlet, and filter means for collecting grease, smoke, odors and vapor from the oven air before it is expelled through the oven air outlet, the oven air outlet including an orifice plate having a plurality of orifices, a plurality of nozzles behind the orifice plate, said nozzles and orifice plate serving as a means for mixing relatively cool room air with the oven air so as to lower its temperature.

8. An electric oven as recited in claim 7 wherein the oven is adapted to be built into a building wall, the said control panel being located at the top portion of the oven over the said access door, the room air inlet being at the lower portion of the control panel, the oven air outlet being at the midportion of the control panel, and the said control means being located at the top portion of the control panel, and a damper located at the room air inlet and capable of closing the room air inlet and thereby connecting the said oven inlet with the oven air outlet so that when the blower means is not energized the oven will be vented through the said oven inlet directly to the oven air outlet.

9. An electric oven as recited in claim 8 wherein the said filter means includes at least three filtering mediums, a grease filter in the oven cavity over the said oven vent, a smoke filter located between the oven vent and the blower means, and an odor filter located between the blower means and the said oven air outlet.

10. An electric oven as recited in claim 9 wherein the said grease filter is of metallic mesh construction that covers a large portion of the said upper broil heating element and functions as a combined broil reflector and grease filter, said smoke filter being of particulate construction of large surface area, while the odor filter comprises charcoal.

11. A domestic oven having walls forming an oven cavity, the invention comprising a venting system that includes an oven vent in one wall of the oven cavity, blower means for drawing oven air through the vent, and an oven control panel comprising an oven air outlet downstream of the blower means, said oven air outlet including an orifice plate and a plurality of nozzles positioned behind the orifice plate so as to draw relatively cool room air from behind the control panel through the orifice plate by a jet action created by the nozzles.

References Cited
UNITED STATES PATENTS

| | | | |
|---|---|---|---|
| 2,729,735 | 1/1956 | Fries | 219—398 |
| 2,886,124 | 5/1959 | Scharmer | 98—115 X |
| 3,026,788 | 3/1962 | Spear | 98—115 |
| 3,051,158 | 8/1962 | Kimberly | 126—21 |
| 3,151,610 | 10/1964 | Hanson et al. | 126—21 X |

RICHARD M. WOOD, *Primary Examiner.*

C. L. ALBRITTON, *Assistant Examiner.*